United States Patent
Greter

(10) Patent No.: US 8,225,791 B2
(45) Date of Patent: Jul. 24, 2012

(54) A RESPIRATORY GAS SUPPLY CIRCUIT TO FEED CREW MEMBERS AND PASSENGERS OF AN AIRCRAFT WITH OXYGEN

(75) Inventor: Vincent Greter, Elancourt (FR)

(73) Assignee: Intertechnique (FR)

( * ) Notice: Subject to any disclaimer, the term of this patent is extended or adjusted under 35 U.S.C. 154(b) by 671 days.

(21) Appl. No.: 12/517,601

(22) PCT Filed: Dec. 5, 2006

(86) PCT No.: PCT/IB2006/003473
§ 371 (c)(1),
(2), (4) Date: Jun. 4, 2009

(87) PCT Pub. No.: WO2008/068545
PCT Pub. Date: Jun. 12, 2008

(65) Prior Publication Data
US 2010/0065056 A1    Mar. 18, 2010

(51) Int. Cl.
*A62B 7/00* (2006.01)
*A62B 9/00* (2006.01)
*G05B 1/00* (2006.01)
*A62B 7/04* (2006.01)
*F16K 31/06* (2006.01)

(52) U.S. Cl. .............. 128/205.11; 128/204.29

(58) Field of Classification Search ............ 128/204.18, 128/204.23, 204.26, 204.29, 205.11, 205.24, 128/205.25, 206.21
See application file for complete search history.

(56) References Cited

U.S. PATENT DOCUMENTS

| | | | |
|---|---|---|---|
| 3,675,649 A | | 7/1972 | Basham et al. |
| 3,768,466 A | * | 10/1973 | Johnson .................. 128/204.26 |
| 4,240,419 A | * | 12/1980 | Furlong et al. ........... 128/204.23 |

FOREIGN PATENT DOCUMENTS

| | | |
|---|---|---|
| EP | 0394076 | 10/1990 |
| FR | 2781381 | 1/2002 |
| FR | 2827179 | 1/2003 |
| FR | 2858560 | 2/2005 |
| WO | WO2006005372 | 1/2006 |

* cited by examiner

*Primary Examiner* — Kristen Matter
(74) *Attorney, Agent, or Firm* — Dean W. Russell; Kilpatrick Townsend & Stockton LLP

(57) ABSTRACT

The invention relates to a respiratory gas supply circuit for an aircraft carrying passengers and/or crewmembers (1) in a cabin, including a source of breathable gas (R1, R2), at least one supply line (20) connected to said source, a first actuating device (60, 12) provided on said supply line to open at least partially or close the supply of breathable gas, a respiratory device (50) adapted to be worn on one passenger or crewmember's face, said respiratory device being connected to said supply line, and further including an ambient air inlet (40), said respiratory device providing to said one passenger or crewmember a respiratory gas to be inhaled corresponding to ambient air and/or breathable gas, wherein said ambient air inlet further includes a second actuating device (4, 11) to open at least partially or close said ambient air inlet; and, both said first and second actuating devices are operated so that at least one of said first and second actuating devices is closed at each instant of time.

29 Claims, 3 Drawing Sheets

A RESPIRATORY GAS SUPPLY CIRCUIT TO FEED CREW MEMBERS AND PASSENGERS OF AN AIRCRAFT WITH OXYGEN

CROSS REFERENCE TO RELATED APPLICATIONS

This application is the U.S. national phase of International Application No. PCT/IB2006/003473 filed on Dec. 5, 2006 and published in English on Jun. 12, 2008 as International Publication No. WO 2008/068545 A1, the entire contents of which are incorporated herein in its entirety by reference.

The present invention relates to a respiratory gas supply circuit for protecting the passengers and crewmembers of an aircraft against the risks associated with depressurization at high altitude and/or the occurrence of smoke in the cockpit.

To ensure the safety of the passengers and crewmembers in case of a depressurization accident or the occurrence of smoke in the aircraft, aviation regulations require on board all airliners a safety oxygen supply circuit able to supply each passenger and crewmember with an oxygen flowrate function of the cabin altitude. After a depressurization accident, the cabin altitude reaches a value close to the aircraft altitude. By cabin altitude, one may understand the altitude corresponding to the pressurized atmosphere maintained within the cabin. In a pressurized cabin, this value is different from the aircraft altitude which is its actual physical altitude.

The minimal oxygen flowrate required at a given cabin altitude generally depends on the nature of the aircraft, i.e. civil or military, the duration and the level of the protection; i.e. emergency descent, ejection, continuation of flying, etc.

A known supply circuit for an aircraft carrying passengers and/or crew members generally comprises:
- a source of breathable gas, e.g. oxygen,
- at least one supply line connected to the source of breathable gas,
- a regulating device connected to the supply line for controlling the supply of breathable gas,
- a respiratory device adapted to be worn on one passenger or crewmember's face. The respiratory device is connected to the supply line, and comprises an ambient air inlet. The respiratory device provides to the passenger or crewmember a respiratory gas to be inhaled corresponding to ambient air and/or breathable gas.

The source of breathable gas may be pressurized oxygen cylinders, chemical generators, or On-Board Oxygen Generator System (OBOGS) or more generally any sources of oxygen. The respiratory gas is generally delivered to the passenger or crewmember through a respiratory device that may be a respiratory mask, a cannula or else.

The need to save oxygen on board an aircraft has lead to the development of respiratory masks comprising a demand regulator as well as oxygen dilution with ambient air (through the mixing device). Such demand regulators are generally available for crewmembers and are known from the documents FR 2,781,381 or FR 2,827,179 disclosing a pneumatic demand regulator, or from WO2006/005372 disclosing an electro-pneumatic demand regulator. Such a respiratory mask, depending on the flight scenario, is either to be worn as a preventive measure, or upon occurrence of an emergency situation such as a depressurization accident.

In a known demand regulator, the oxygen flow is coupled to the inspiratory demand of the mask wearer. With each inspiratory cycle, a respiratory gas, comprising a mixture of breathable gas and ambient air, is delivered to the mask wearer. The right oxygen content of the respiratory gas is provided to compensate for any decrease in ambient cabin pressure. The terminology dilution is generally used as highly enriched oxygen or pure oxygen gas is mixed with ambient air or dilution air. Aviation regulations (FAR) further define minimum oxygen content of the respiratory gas based on the cabin pressure (or cabin altitude).

Known demand regulator, either pneumatic or electropneumatic based, are often complex devices, that require strainuous tuning and adjustments or specific software developments (when electronic is involved), as they must adjust continuously the oxygen content of the respiratory gas based on the ambient cabin pressure. Furthermore, regarding pneumatic devices, dilution is generally based on a Venturi system, leading to pressure losses that are taken from the breathable gas source. The respiratory masks comprising such demand regulators are thus incompatible with low pressure breathable gas sources.

Today, there is a need for a respiratory mask capable of operating with low pressure source. There is also a need for a simpler respiratory mask, requiring less tuning or software development, and that could actually be used both for passengers and crewmembers (here after called end users). There is a further need for a respiratory gas supply circuit capable of operating with such masks.

Additionally, as the known demand regulators are difficult to tune, conservative margins are taken into account to ensure that the FAR minimum oxygen contents are respected. Consequently, the actual oxygen content delivered by a demand regulator is significantly greater than the FAR data, leading to higher oxygen consumption.

Furthermore, respiratory device to protect passengers in case of emergency are often simple devices, and the passenger is generally fed with continuous flow of breathable gas only. This approach increases significantly the need in breathable gas, leading to high oxygen consumption.

Today, there is an additional need for further oxygen savings as, whether the oxygen comes from a generator or a pressurized source, the onboard oxygen mass is directly linked to the estimated needs from passengers and crewmembers. Any optimization of the oxygen supply with actual needs will result in lighter oxygen sources, and reduced constraints on the aircraft structures and fuel consumption.

Thus, it is further desirable to develop a supply circuit capable of providing a respiratory gas to an end user with a breathable gas content closer to the aviation regulations so as to ensure optimized oxygen sources.

With only one ambient air or breathable gas inlets open, such a system is capable of alternatively feeding the end user with ambient air or breathable gas only. The invention is based on the applicant's findings that over a limited number of respiratory cycles, the end user is insensitive to oxygen content variation in the respiratory gas. Such a number of respiratory cycles during which the protected end user is physiologically insensitive to breathable gas content variations is generally dependent upon the environment the end user is surrounded with, notably the ambient pressure.

Thanks to the supply circuit according to the invention, as no mixing of ambient air and breathable gas is required, a simpler system is achieved, capable of functioning with low pressure breathable gas, without being detrimental to the end user's protection in case of emergency situations such as a depressurization accident.

Such a simple supply circuit is applicable both to crewmembers and passengers.

The above features, and others, will be better understood on reading the following description of particular embodiments, given as non-limiting examples. The description refers to the accompanying drawing.

Figure 1:
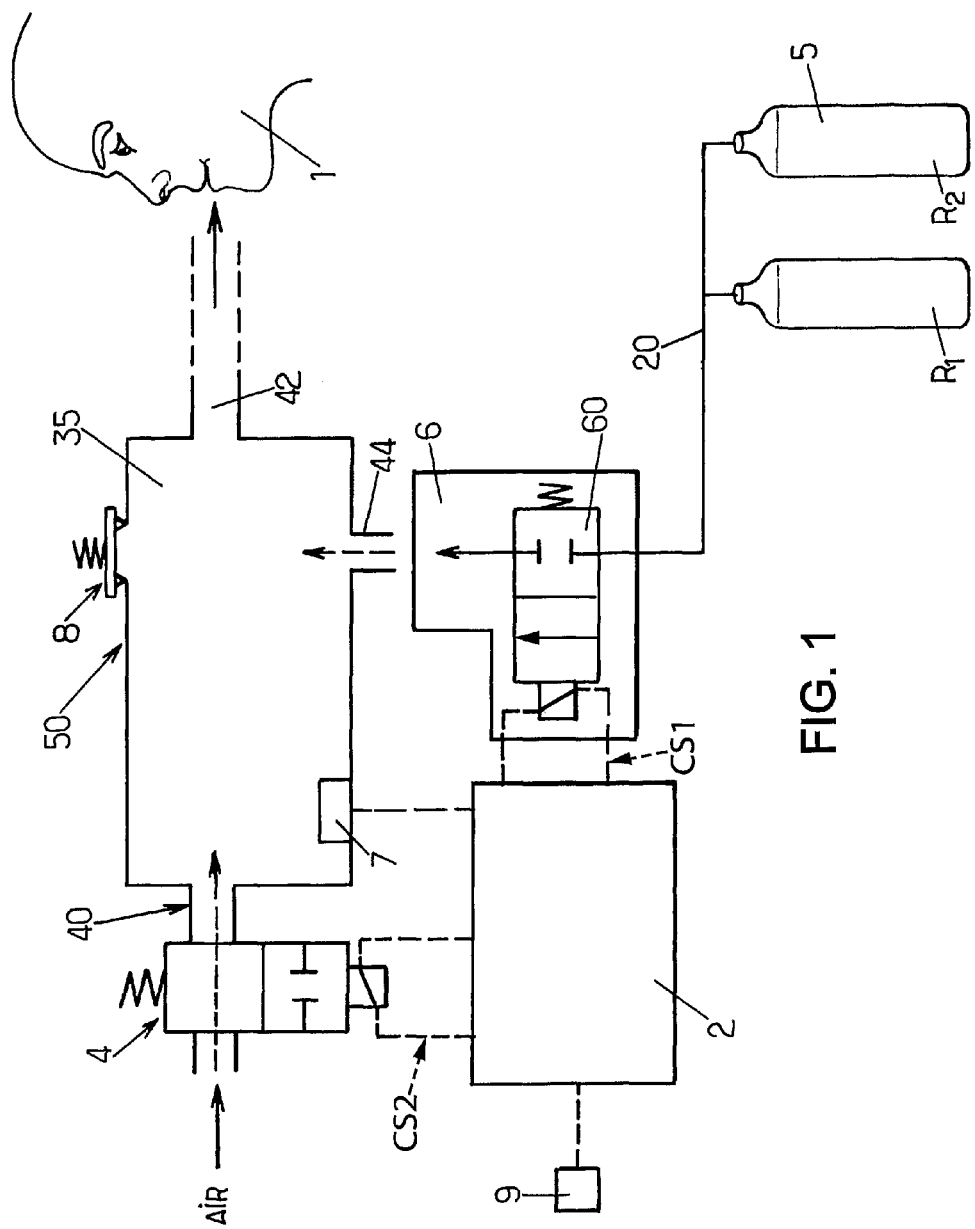
FIG. 1 is a schematic of a respiratory gas supply circuit for an aircraft carrying passengers and crewmembers in a first implementation of the invention.

In reference to FIG. 1, the supply circuit according to the invention comprises a source of breathable gas 5, here illustrated as a couple of oxygen tanks R1 and R2. Each tank comprises a reducing valve on their respective outlet to deliver through a supply line 20 the breathable gas to the passengers and crewmembers 1 of the aircraft. Other sources of breathable gas may be used in the supply circuit according to the invention.

Supply line extends to a respiratory device, here after described as a respiratory mask 50, adapted to be applied to the end user's face. In the following description, the respiratory mask is illustrated as, but not limited to, a mask with a demand regulator 6.

An ambient air inlet 40 is provided on the respiratory mask 50, so that ambient air arrived into a chamber 35. Such chamber provides to the mask outlet 42 a respiratory gas corresponding alternatively of the breathable gas and of the ambient air. The respiratory gas to be inhaled is fed to the crewmember or passenger 1 through the mask 50 when applied on his/her face.

The chamber 35 is used also as a recipient of the breathed out gas coming from the mask outlet 42.

The breathed out gas goes out of the chamber through the exhaling valve 8 which opens when the pressure inside the chamber 35 increases above a predetermined value.

The breathable gas is provided into the mixing chamber 35 through the demand subassembly 6 connected to the supply line 20. The demand subassembly 6 comprises a first actuating device 60 to open at least partially or close the supply of breathable gas. The first actuating device 60 may be for example an electro-valve. In the example of a demand regulator, as illustrated in FIG. 1, the first actuating 60 device is a regulating device to control the supply in breathable gas to the mask 50. The demand subassembly is connected to the chamber 35 through inlet 44.

In the supply circuit, a second actuating device 4 is further provided on the ambient air inlet 40 to open at least partially or close ambient air inlet. In an embodiment of the supply circuit, the second actuating device 4 is an on/off actuating device, such as, for example, an on/off type solenoid valve.

Both the first 60 and second 4 actuating devices are operated so that at least one of said first and second actuating devices is closed at each instant of time. Such a feature allows the system to perform breathable gas only or ambient air only supply phases.

Such a supply system ought to generally compensate for any variation in the cabin pressure. In an embodiment of the circuit, the first and second actuating devices are operated at least as a function of the cabin pressure.

To that effect, a first pressure sensor 9 is provided in the aircraft cabin to measure the cabin pressure (measured in hPa for example), data which is equivalent to the cabin altitude (generally measured in feet) as defined before. Cabin pressure sensor 9 provides a cabin pressure signal representative of the cabin pressure to an electronic circuit 2.

In the described implementation of the supply circuit, the first and second actuating devices are operated by control signals at least function of the cabin pressure and provided by the electronic circuit 2.

The pressure sensor 9 may be one of the pressure sensors available in the aircraft, its value being available upon connection to the aircraft bus. Or, in order to ensure a reliable reading of the pressure independent of the aircraft bus system, the circuit according to the invention may be provided with its own pressure sensor, i.e. a dedicated sensor 9 is provided for electronic circuit 2.

In an embodiment of the supply circuit, the regulating device 60 is driven by a first control signal CS1 provided by the electronic circuit 2. Said electronic unit elaborates the control signal CS1 sent to regulating device 60. Actuating device 4 is driven by a control signal CS2 provided by electronic unit 2. Thus both actuating devices 60 and 4 are driven by control signals, CS1 and CS2 respectively, function at least of the cabin pressure. Such embodiment allows an independent control of the actuating devices, allowing breathable gas only, ambient air only or a mixture of the two supply phases.

The described supply circuit functions as follows. Upon reading the cabin pressure signal provided by pressure sensor 9, electronic unit 2 determines the breathable gas ratio (generally called $F_iO_2$) in the respiratory gas required e.g. by the aviation regulations FAR for such a cabin pressure value. Other parameters may be taken into account to determine said ratio. Instead of using the regulating device 6 to deliver a mixture of ambient air and breathable gas corresponding to said ratio as in known devices, the electronic unit 2 determines a couple of time intervals, namely a first time interval T1 and a second time interval T-T1. The first time interval T1 corresponds to a "breathable gas only" supply to the respiratory device, while the second time interval T-T1 corresponds to an ambient air only supply. The sum of the first and second time intervals T is a duration over which the end user is physiologically insensitive to the $F_iO_2$ variations. The time intervals T1 and T-T1 may be expressed as numbers of respiratory cycles.

The times intervals are such that the amount of breathable gas delivered during T1 when compared to the amount of ambient air supplied during T-T1 physiologically correspond to the here above determined ratio $F_iO_2$. This approach is based on the applicant's findings that the end user, over the limited period of time T, is insensitive to the breathable gas content variations.

Whether:

a respiratory gas is delivered with the right $F_iO_2$, or breathable gas only is first fed during T1, followed by ambient air only during T-T1, so that $F_iO_2$ is respected over the duration T, the result is equivalent for the end user from a physiological point of view, provided the duration T is limited. Duration T may be determined through tests and trials, for example by monitoring the PaO2 (oxygen partial pressure in the arterial blood) to avoid any unwanted low levels.

With this approach, the time intervals T and T-T1 may be longer than a breath-in interval which means that, during one breath-in interval, inhaled gas comprise only breathable gas or ambient air.

After calculation of the time intervals, the electronic unit 2 operates one of the first and second actuating devices to close while operating the other to open during a duration corresponding to said first time interval T1. After said duration, the electronic unit 2 then operates the closed actuating device to open while operating to close the open actuating device during a consecutive duration corresponding to said second time interval T-T1. At each instant of time over the duration T, only one of the first and second actuating devices is open. The resulting respiratory gas supply cycle comprises a breathable gas only phase and an ambient air only phase. The circuit may either start with the former or the latter.

The here above regulation provides a new first and second time interval determination after the duration corresponding to total time interval T is lapsed.

At the end of time interval T, electronic circuit 2 calculates a new value of the breathable gas ratio $F_iO_2$ based at least on the current information from cabin pressure sensor 9. New values of T1 and T-T1 are then calculated so that the next respiratory gas supply cycle may be carried out as described above.

In an embodiment of the supply circuit, the first and second time intervals T1 and T-T1 correspond substantially to integer numbers, respectively N1 and N-N1, of respiratory cycles of the end user wearing the respiratory device. Each respiratory cycle may be defined as one breathing-in and one breathing-out phases. N corresponds to the number of respiratory cycles over which the end user is physiologically insensitive to the $F_iO_2$ variations.

To that effect, a second pressure sensor 7 is provided in the respiratory device to characterise the respiratory cycles of the end user wearing the respiratory device. Furthermore, the electronic circuit 2 is adapted to count the respiratory cycles thanks to the second pressure sensor 7. The counting may be based for example on the pressure decrease resulting from the breath-in phase of a respiratory cycle and/or the pressure increase from the breath-out phase. Thus, during N1 respiratory cycles, breathable gas is only supplied to the end user. During the following N-N1 cycles, only ambient air is fed to said end user. During the breathing out phase of the $N^{th}$ respiratory cycle (or before), electronic circuit 2 calculates the new $F_iO_2$ value so that the next regulation sequence may be carried out.

Figure 2:
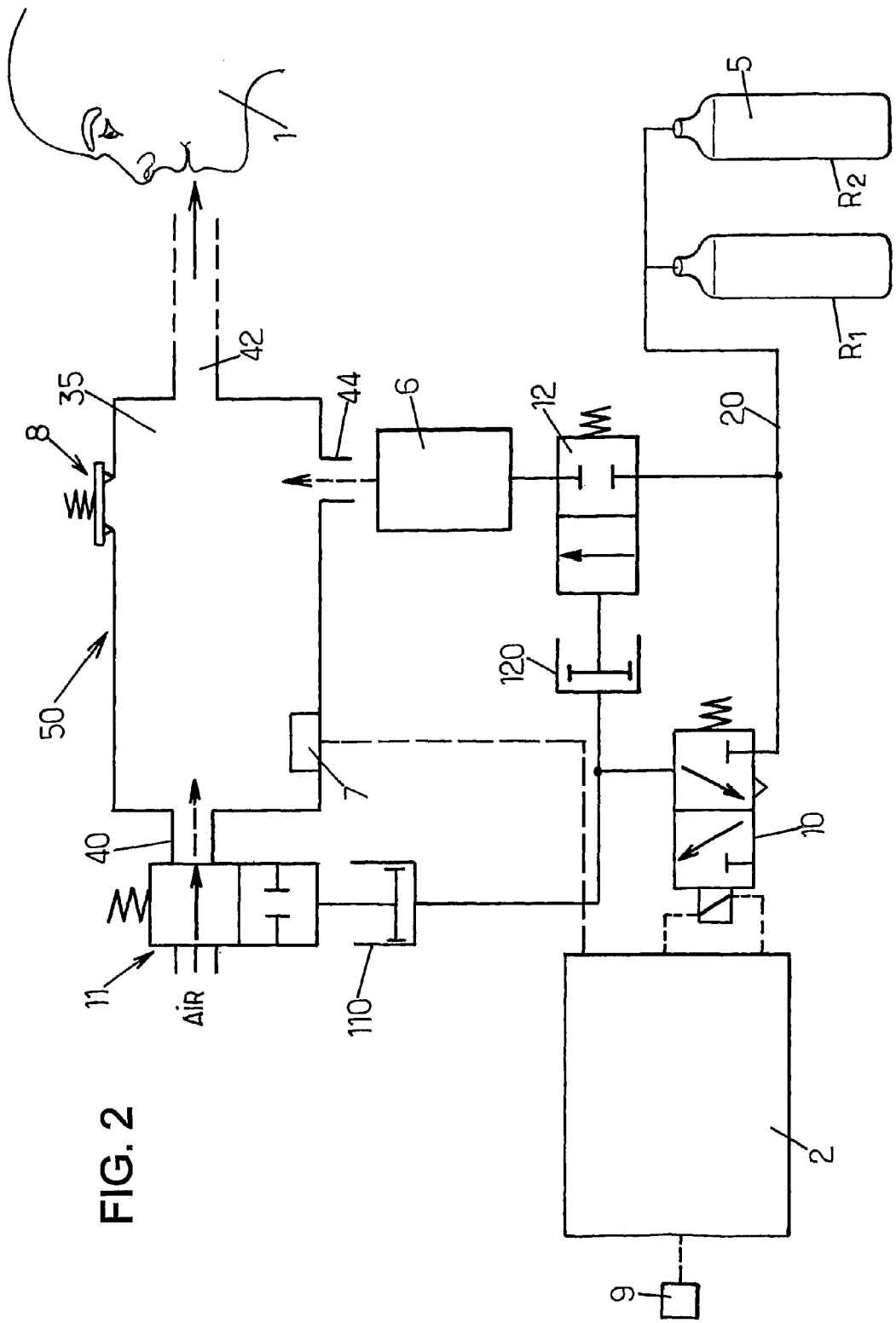
FIG. 2 is a schematic of a respiratory gas supply circuit for an aircraft carrying passengers and crewmembers in a second implementation of the invention; and, FIG. 3 is a schematic of a respiratory gas supply circuit for an aircraft carrying passengers and crewmembers in a third implementation of the invention.

Depending on the use of the supply circuit according to the invention, actuating devices 4, 60 may be normally open or closed, bi- or mono-stable, or driven by a unique control device as shown in FIG. 2 and described later on.

In an embodiment of the supply circuit, to further reinforce the security of the end users, both the first and second time intervals are determined again as soon as cabin pressure signal provided by first sensor 9 varies beyond a given safe deviation, which may be before total time interval T is elapsed.

The valve 8 may be located on the supply circuit or replaced by the actuating device 4 that is driven open by electronic circuit 2 when a breathing out phase is detected by second pressure sensor 7.

The here above regulation of the supply circuit according to the invention allows a more economical system. Indeed, alternating breathable gas only phases with ambient air only phases allows a better control of the supply in breathable gas, when compared with the known dilution techniques, wherein significant margins are to be taken into account to ensure the minimal FAR requirements. The dilution is advantageously replaced by controlled alternating ambient air and breathable gas only phases, the result of which allows a supply in respiratory gas closer from the FAR curves.

In the second implementation of the supply circuit shown in FIG. 2, the same numbers refer to the same elements described here-above.

A first actuating device 11 is provided on the ambient air inlet 40, while a second actuating device 12 is provided upstream the demand subassembly 6. The supply circuit further comprises a third actuating device 10 operated by a control signal at least function of the cabin pressure and provided by the electronic circuit 2. As in the first implementation, a first pressure sensor 9 is provided in the aircraft cabin to measure the cabin pressure and provide a cabin pressure signal to the electronic circuit representative of the cabin pressure. In the second implementation, the first 11 and second 12 actuating devices are pneumatically coupled to the third actuating device 10 which may be an electrically-controlled valve, for example a solenoid valve.

In an embodiment of the second implementation, the first and second actuating devices 11, 12 are pneumatic actuators, one of them being normally closed while the other is normally open. Furthermore, the electronic unit 2, upon reading the cabin pressure signal provided by sensor 9, and calculating the breathable gas ratio as described before, determines a first time T1 and a second time T-T1 intervals. During a duration corresponding to T1, the third actuating device 10 is not operated. The first and second actuating devices are maintained in their normal state, i.e. open or closed.

The normally open actuating device, being the first or second one, allows either respectively breathable gas or ambient air into the mixing chamber 35. During the subsequent time interval T-T1, the third actuating device 10 is operated by electronic device 2 so as to close the normally open actuating device and open the normally closed actuating device. Thus, only one of the first and second actuating devices 11, 12 is open at each instant of time.

The actuating devices 11 and 12 may be pneumatically operated by the third actuating device 13 thanks to piston devices 110 and 120 respectively. More specifically, the piston assemblies 110 and 120 are operatively, i.e. pneumatically, coupled to actuating devices 10 and 20 respectively. In this second implementation of the supply circuit, the first and second actuating devices are actually indirectly operated (through the third actuating device) at least as a function of the cabin pressure.

For example, each piston device comprises a piston chamber that can be either connected to the atmosphere or else to the source of oxygen at a higher pressure level than the atmosphere. To that effect, actuating device 10 is also connected to the supply line 20. As the actuating device 10 is connected to both piston chambers, it serves to switch the pressure in said piston chambers from ambient air to breathable gas pressure levels.

During one phase of the respiratory gas supply cycle, the piston chambers of piston devices 110 and 120 are connected to the atmosphere, i.e. the third actuating device 10 is either not operated by electronic circuit 2 and/or connected to the atmosphere. The first and second actuating devices 11, 12 are in their initial state (one of them being normally open while the other is normally closed). Only the normally open actuating device allows gas into chamber 35. During the other phase of the resulting respiratory gas supply cycle, third actuating device 10 is connected to the supply line 20 by a signal from electronic unit 2 and piston devices expand so as to drive the normal open actuating device to the close state and the normally close device to the open state. The other gas is allowed into chamber 35. At all instant of time, only one of breathable gas and ambient air is allowed into chamber 35.

In case of a sudden depressurization accident, it might be desirable to start the supply in respiratory gas with $O_2$ only cycles in case such an event occurs at a very high cruising altitude. The number of $O_2$ only cycles ought to be enough to ensure the security of the crewmembers and passengers. The here above economical regulation may be carried on after the aircraft reaches its diversion altitude, which is a lower altitude an aircraft must return to after such an accident.

A PID (proportional, integral, derivative) module may be comprised within electronic circuit 2 to elaborate the control signals to drive the different actuating devices.

The described supply circuit may be applied to a mask with no demand regulator, such as a mask with a continuous flow-rate regulator or a respiratory mask for passengers.

Figure 3:
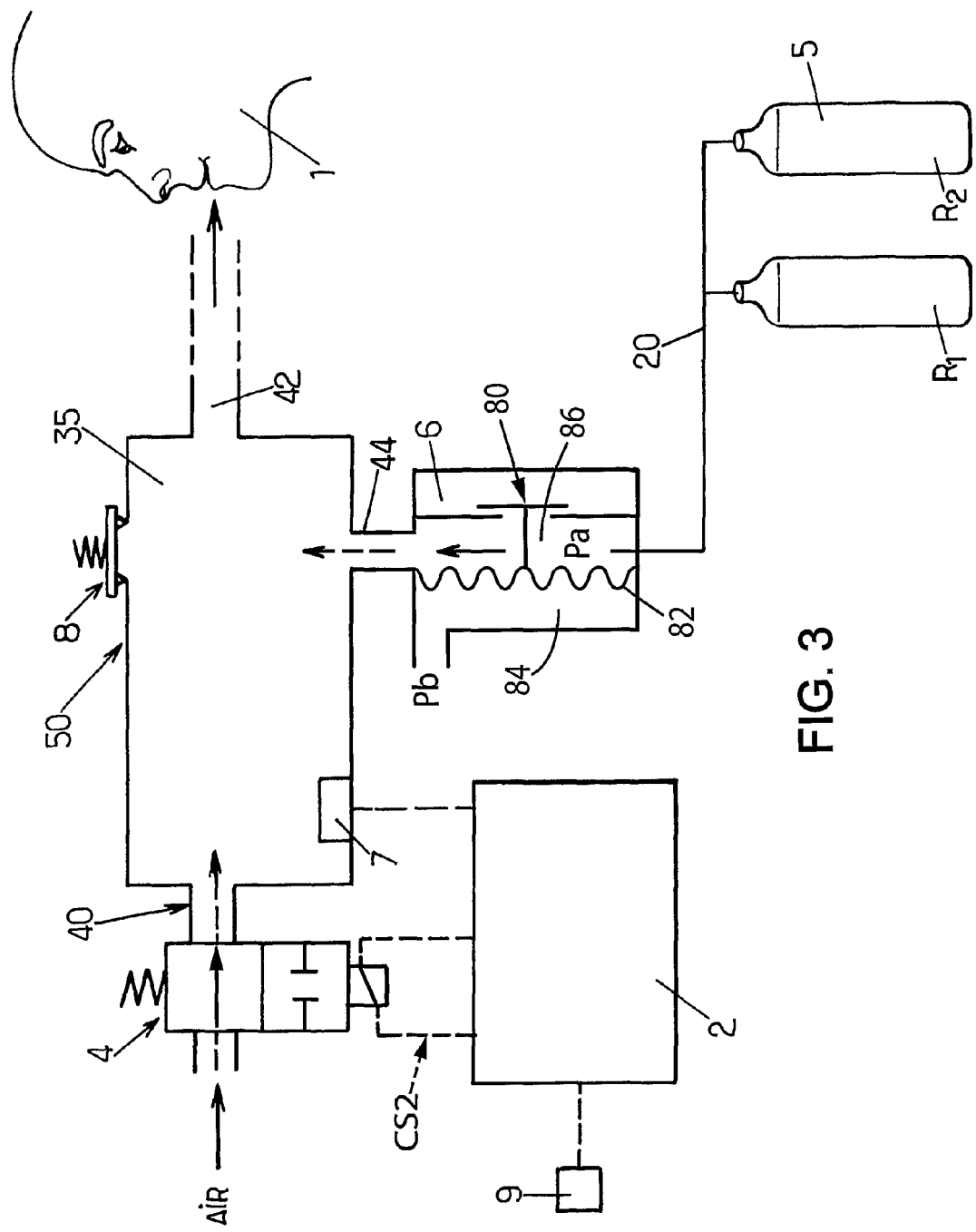

A third embodiment, is illustrated FIG. 3 where elements identical or similar to the other embodiments described here above have the same reference number.

The chamber 35 receives ambient air through its inlet 40. The openness of this inlet 40 is controlled by an actuating device 4 as in previous embodiment. The actuating device 4 is operated by a control signal CS2 at least function of the cabin pressure and provided by electronic circuit 2. As previously described the electronic circuit 2 receives a cabin pressure signal from the pressure sensor 9 as well as a chamber pressure signal from the second pressure sensor 7. The chamber pressure signal is used by the electronic circuit 2 to monitor the breathing rhythm of the user 1.

In this third embodiment, the demand regulator 6 is connected directly to the supply line 20 of the breathable gas and acts as an on/off device.

The operation of the supply circuit in this embodiment is based on the fact that the demand regulator is normally in a closed stated and open during a breathing phase in which the pressure inside the chamber 35 is below a predetermined pressure $P_b$. The demand regulator 6 comprises a valve connected to a diaphragm 82. The diaphragm separates a first volume 84 at a constant pressure Pb to a second volume 86 at a pressure Pa.

As the volume 86 is connected to the respiratory device, the pressure varies with the breath of the user. When the user breathes in, and the inlet 40 is closed, the pressure Pa decreases and when the user breathes out, the pressure Pa increases. When the pressure Pa decreases below the pressure Pb of the first volume 84, the diaphragm pushes the valve 80 to an open state.

When the actuating device 4 is open, the pressure in the chamber 35 is above the predetermined pressure $P_b$. In fact $P_b$ is determined so that the pressure in the chamber 35 is below $P_b$ only during a breath in phase with the actuating device 4 in a closed state.

A demand regulator which could be used in the particular embodiment is, for instance, described in WO 2006/005372.

The person skilled in the art understands that the demand regulator 6 acts as a passive actuating device to open or close the breathable gas circuit 20.

While the invention has been illustrated and described in details in the drawings and foregoing description, such illustration and description are to be considered illustrative or exemplary and not restrictive; the invention is not limited to the disclosed embodiments.

For instance, in the hereabove description, the actuating device 4 and the regulating device 6 are located within the respiratory mask. In alternative embodiments, these features may be located upstream the mask in the supply line.

In the present illustration, the regulating device 6 drives the breathable gas supply to one mask 50. The man skilled in the art will easily transpose the teachings of the present invention to a regulating device regulating the supply in breathable gas to a cluster of masks 50 thanks to control signals based on the cabin pressure.

Other variations to the disclosed embodiment scan be understood and effected by those skilled on the art in practising the claimed invention, from a study of the drawings, the disclosure and the appended claims. In the claims, the word "comprising" does not exclude other elements and the indefinite "a" or "an" does not exclude a plurality.

The invention claimed is:

1. A respiratory gas supply circuit for an aircraft carrying passengers and/or crewmembers in a cabin, comprising:
a source of breathable gas,
at least one supply line connected to said source,
a first actuating device provided on said supply line to open at least partially or close the supply of breathable gas,
a respiratory device adapted to be worn on one passenger or crewmember's face, said respiratory device being connected to said supply line, and further comprising an ambient air inlet, said respiratory device providing to said one passenger or crewmember a respiratory gas to be inhaled corresponding to ambient air and/or breathable gas,
said ambient air inlet further comprises a second actuating device to open at least partially or close said ambient air inlet; and,
both said first and second actuating devices are operated so that at least one of said first and second actuating devices is closed at each instant of time,
a first pressure sensor in the cabin configured to provide a cabin pressure signal representative of the cabin pressure, and
an electronic circuit (i) determining first and second time intervals based at least in part on the cabin pressure signal and (ii) operating the second actuating device so as, (A) during a first duration corresponding to the first time interval, either to open or to close the second actuating device, and (B) during a second duration corresponding to the second time interval, to close the second actuating device if it was open during the first duration or to open the second actuating device if it was closed during the first duration, the first duration and the second duration being consecutive in time.

2. A circuit according to claim 1, wherein the second actuating device is an on/off actuating device.

3. A circuit according to claim 1, wherein the first and second time intervals correspond substantially to integer numbers of respiratory cycles of the passenger or crewmember wearing the respiratory device, each respiratory cycle comprising one breathing-in and breathing-out phases.

4. A circuit according to claim 3, wherein a second pressure sensor is provided in the respiratory device to determine the respiratory cycles of the passenger or crewmember wearing said respiratory device, the electronic circuit being adapted to count the respiratory cycles through said second pressure sensor.

5. A circuit according to claim 1, wherein the electronic circuit determines again the first and second time intervals either after the duration corresponding to said time intervals is lapsed, or when the cabin pressure signal has varied beyond a given deviation.

6. A circuit according to claim 1, wherein the respiratory device is a respiratory mask comprising a demand regulator.

7. A circuit according to claim 6, wherein the demand regulator comprises the first actuating device.

8. A circuit according to claim 7, wherein the first actuating device is a passive on/off device reacting to a difference of pressure between the pressure of the respiratory device and a predetermined pressure.

9. A circuit according to claim 1, wherein the first and second actuating devices are operated at least as a function of the cabin pressure.

10. A circuit according to claim 1, further comprising a third actuating device, and wherein the first and second actuating devices are pneumatically coupled to said third actuating device, said third actuating device being operated by a control signal as at least a function of the cabin pressure and provided by the electronic circuit.

11. A respiratory device providing to a passenger or crewmember of an aircraft, a respiratory gas to be inhaled corresponding to ambient air and/or breathable gas, and adapted to be worn on said passenger or crewmember's face in case of emergency, said respiratory device being connected to a source of breathable gas through at least one supply line and comprising:
   a first actuating device provided on said supply line to open at least partially or close the supply of breathable gas,
   an ambient air inlet comprising a second actuating device to open at least partially or close said ambient air inlet; and,
   both said first and second actuating devices being operated so that at least one of said first and second actuating devices is closed at each instant of time,
   a first pressure sensor in the cabin configured to provide a cabin pressure signal representative of the cabin pressure, and
   an electronic circuit (i) determining first and second time intervals based at least in part on the cabin pressure signal and (ii) operating the second actuating device so as, (A) during a first duration corresponding to the first time interval, either to open or to close the second actuating device, and (B) during a second duration corresponding to the second time interval, to close the second actuating device if it was open during the first duration or to open the second actuating device if it was closed during the first duration, the first duration and the second duration being consecutive in time.

12. A respiratory device according to claim 11, wherein the second actuating device is an on/off actuating device.

13. A respiratory device according to claim 11, wherein the first and second time intervals correspond substantially to integer numbers of respiratory cycles of the passenger or crewmember wearing said respiratory device, each respiratory cycle comprising one breathing-in and breathing-out phases.

14. A respiratory device according to claim 13, wherein a second pressure sensor is provided in said respiratory device to determine the respiratory cycles of the passenger or crewmember wearing said respiratory device, the electronic circuit being adapted to count the respiratory cycles through said second pressure sensor.

15. A respiratory device according to claim 11, wherein the electronic circuit determines again the first and second time intervals either after the duration corresponding to said time intervals is lapsed, or the cabin pressure signal has varied beyond a given deviation.

16. A respiratory device according to claim 11, wherein said respiratory device is a respiratory mask comprising a demand regulator.

17. A respiratory device according to claim 16, wherein the demand regulator comprises the first actuating device.

18. A respiratory device according to claim 17, wherein the first actuating device is a passive on/off device reacting to a difference of pressure between the pressure inside the respiratory device and a predetermined pressure.

19. A respiratory device according to claim 11, further comprising a third actuating device, and wherein the first and second actuating devices are pneumatically coupled to said third actuating device, said third actuating device being operated by a control signal as at least a function of the cabin pressure and provided by the electronic circuit.

20. A method to supply a respiratory gas in an aircraft carrying passengers and/or crewmembers in a cabin, said aircraft comprising:
   a source of breathable gas,
   at least one supply line connected to said source,
   a first actuating device provided on said supply line to open at least partially or close the supply of breathable gas,
   a respiratory device adapted to be worn on one passenger or crewmember's face, said respiratory device being connected to said supply line, and further comprising an ambient air inlet, said respiratory device providing to said one passenger or crewmember a respiratory gas to be inhaled corresponding to ambient air and/or breathable gas,
   a second actuating device provided on said ambient air inlet to open at least partially or close said ambient air inlet,
   the method comprising the steps of:
   a) measuring the cabin pressure,
   b) determining a first time interval and a second time interval based at least in part on the measured cabin pressure, and
   c) operating the second actuating device so as, (i) during a first duration corresponding to the first time interval, either to open or to close the second actuating device, and (ii) during a second duration corresponding to the second time interval, to close the second actuating device if it was open during the first duration or to open the second actuating device if it was closed during the first duration, the first duration and the second duration being consecutive in time and so that at least one of said first and second actuating devices is closed at each instant of time.

21. A method according to claim 20, wherein the second actuating device is an on/off actuating device.

22. A method according to claim 20, wherein the first and second time intervals correspond substantially to integer numbers of respiratory cycles of the passenger or crewmember wearing the respiratory device, each respiratory cycle comprising one breathing-in and breathing-out phases.

23. A method according to claim 22, wherein a second pressure sensor is provided in the respiratory device, said method further comprising the step of determining the respiratory cycles of the passenger or crewmember wearing said respiratory device.

24. A method according to claim 20, further comprising the step of determining again the first and second time intervals either after the duration corresponding to said time intervals is lapsed, or the cabin pressure signal has varied beyond a given deviation.

25. A method according to claim 20, wherein the respiratory device is a respiratory mask comprising a demand regulator.

26. A method according to claim 25, wherein the demand regulator comprises the first actuating device.

27. A method according to claim 26, wherein the first actuating device is a passive on/off device reacting to a difference of pressure between the pressure of the respiratory device and a predetermined pressure.

28. A method according to claim 20, wherein the first and second actuating devices are operated as at least a function of the cabin pressure.

29. A method according to claim 20, wherein the aircraft further comprises a third actuating device, the first and second actuating devices being pneumatically coupled to said third actuating device, and wherein the third actuating device is operated as at least a function.

* * * * *